(12) United States Patent
Zhong et al.

(10) Patent No.: US 11,175,121 B2
(45) Date of Patent: Nov. 16, 2021

(54) LEVER INDICATOR

(71) Applicant: GUILIN JINGZHUN MEASUREMENT AND CONTROL TECHNOLOGY Co., Ltd., Guangxi (CN)

(72) Inventors: Sheng Zhong, Guangxi (CN); Biao Zhao, Guangxi (CN)

(73) Assignee: GUILIN JINGZHUN Meas. and Control Tech. Co., Ltd., Guangxi (CN)

( * ) Notice: Subject to any disclaimer, the term of this patent is extended or adjusted under 35 U.S.C. 154(b) by 165 days.

(21) Appl. No.: 16/610,501

(22) PCT Filed: Jul. 17, 2018

(86) PCT No.: PCT/CN2018/095986
§ 371 (c)(1),
(2) Date: Nov. 2, 2019

(87) PCT Pub. No.: WO2019/128199
PCT Pub. Date: Jul. 4, 2019

(65) Prior Publication Data
US 2021/0156659 A1    May 27, 2021

(30) Foreign Application Priority Data

Dec. 28, 2017 (CN) .......................... 201711463825.7
Dec. 28, 2017 (CN) .......................... 201721879640.X

(51) Int. Cl.
*G01B 3/22* (2006.01)
(52) U.S. Cl.
CPC ..................................... *G01B 3/22* (2013.01)

(58) Field of Classification Search
None
See application file for complete search history.

(56) References Cited

U.S. PATENT DOCUMENTS 1,377,006 A * 5/1921 Deming .................... G01B 3/22
33/628
1,436,111 A * 11/1922 Reich ....................... G01B 5/28
33/533
(Continued)

FOREIGN PATENT DOCUMENTS

CN         2409490 Y      12/2000
CN       101526328 A       9/2009
(Continued)

*Primary Examiner* — Christopher W Fulton
(74) *Attorney, Agent, or Firm* — Craft Chu PLLC; Andrew W. Chu

(57) ABSTRACT

The lever indicator includes a housing, a measuring lever, a displacement sensor and a microcontroller. After extending to the interior of the housing, a tail end of the measuring lever synchronously swings with the displacement sensor for measurement. The microcontroller is located in the housing, and amends and calculates a measurement result according to a signal generated by the swinging of the displacement sensor, and a liquid crystal display for displaying the measurement result is further arranged outside the housing. The displacement sensor includes a fixing grid and a moving grid of a sector structure. The fixing grid is fixed inside the housing, and is correspondingly located above the tail end of the measuring lever. The moving grid is fixed onto the tail end of the measuring lever and swings relative to the fixing grid after linked with the measuring lever.

11 Claims, 12 Drawing Sheets

(56) References Cited

U.S. PATENT DOCUMENTS

| | | | | |
|---|---|---|---|---|
| 2,129,311 | A | * | 9/1938 | Street .................. G01B 5/28 33/559 |
| 2,341,809 | A | * | 2/1944 | Pearson ............... G01B 3/22 33/559 |
| 2,621,413 | A | * | 12/1952 | Welch .................. G01B 5/28 33/556 |
| 2,840,917 | A | * | 7/1958 | Koch ................... G01B 3/22 33/556 |
| 3,019,639 | A | * | 2/1962 | Staples ................ G01B 5/28 73/105 |
| 3,464,118 | A | * | 9/1969 | Kaneo .................. G01B 3/22 33/556 |
| 4,188,727 | A | | 2/1980 | Matui |
| 5,337,489 | A | * | 8/1994 | Mustafa ............ E21B 41/0007 33/534 |
| 6,295,866 | B1 | * | 10/2001 | Yamamoto .......... G01B 3/008 33/501.04 |
| 2004/0168332 | A1 | * | 9/2004 | Hama .................. G01B 5/28 33/551 |
| 2015/0075020 | A1 | * | 3/2015 | Mori .................... G01B 5/008 33/556 |
| 2016/0231150 | A1 | * | 8/2016 | Terauchi ............. G01B 21/045 |

FOREIGN PATENT DOCUMENTS

| | | | |
|---|---|---|---|
| CN | 105135974 A | | 12/2015 |
| CN | 108106508 A | | 12/2017 |
| JP | 2014032177 A | * | 2/2014 ............. G01B 21/20 |

\* cited by examiner

LEVER INDICATOR

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to the field of measuring instruments, and in particular, to a lever indicator.

2. Description of Related Art Including Information Disclosed Under 37 CFR 1.97 and 37 CFR 1.98

The lever indicator is also known as a lever dial indicator or a pictest. The conventional lever indicator is a measuring instrument that uses a lever-gear transmission mechanism to transform a size into a pointer angular displacement to indicate a length dimension value, is configured to measure a geometric form error of a workpiece and determine mutual position correctness, and can measure a length through a comparison method.

With the development of measurement technologies, there is a digital display lever indicator capable of digitally displaying a measurement result through a displacement sensor on the market. Existing digital display lever indicators at home and abroad are transformed by replacing pointers of indicators with capacitive grid encoders on the basis of mechanical components, namely gear transmission mechanisms, of common mechanical lever indicators. Therefore, the gear transmission mechanisms are retained. As the mechanical component of the mechanical lever indicator is a precision component, a manufacturing process of especially the precision gear transmission mechanism is complicated, and a requirement on production equipment is higher. However, the service life of the mechanical component is shorter.

The Chinese patent with Application No. CN99124574.1 discloses a capacitive-grid-type digital display lever indicator, which simplifies a mechanical structure and a circuit structure of the existing digital display lever indicator to a certain extent. But, in this capacitive-grid-type digital display lever indicator, as a moving grid is mounted on a round dial which is rotatable through a rotating shaft (a rotary center of the round dial) and a lever arm of the display lever indicator pushes the round dial to rotate around the rotating shaft, it is necessary to provide a motion transmission mechanism between the lever arm and the round dial of the capacitive-grid-type display lever indicator, otherwise the round dial cannot be rotated. For example, if an end of the lever arm is a sector gear, gear teeth matched with the sector gear are formed at the periphery of the round dial; and when the lever arm swings, the sector gear at the end of the lever arm pushes the round dial to rotate. No matter what kind of the motion transmission mechanism is used between the lever arm and the round dial, at least one stage of motion transmission is added. As long as one stage of motion transmission is added, the cost and introduction error are increased. Moreover, after repeated use of the added transmission mechanism, a component such as the gear is worn, thus the accuracy is adversely affected, shortening the service life of the lever indicator eventually.

BRIEF SUMMARY OF THE INVENTION

In summary, in order to overcome the deficiencies in the prior art, a technical problem to be solved by the present invention is to provide a lever indicator.

The technical solution of the present invention to solve the above technical problem is as follows. A lever indicator includes a housing, a measuring lever, a displacement sensor and a microcontroller, wherein the displacement sensor is located inside the housing; the measuring lever is rotatably mounted on the housing; the front end of the measuring lever extends out of the housing to be provided with a measuring contactor; after extending to the interior of the housing, a tail end of the measuring lever synchronously swings with the displacement sensor for measurement; the microcontroller is located in the housing, and amends and calculates a measurement result according to a signal generated by the swinging of the displacement sensor; and a liquid crystal display for displaying the measurement result is further arranged outside the housing. The displacement sensor is any one of a capacitive grid sensor, a magnetic grid sensor or a CCD displacement sensor, and is composed of a fixing grid and a moving grid of a sector structure; the fixing grid is fixed in the housing and is correspondingly located above the tail end of the measuring lever; and the moving grid is fixed onto the tail end of the measuring lever and swings relative to the fixing grid after linked with the measuring lever.

The present invention has the following beneficial effects. A whole precision motion transmission mechanism between a lever arm and the moving grid is eliminated from the lever indicator, so that on one hand, the production cost is greatly reduced; and on the other hand, as there is no intermediate motion transmission mechanism between the lever arm and the moving grid, errors caused by multi-stage transmission are reduced, greatly improving the measurement accuracy.

Based on the above technical solution, the present invention may be further improved as follows.

Further, an anti-slanting-swinging mechanism for limiting slanting swinging of the measuring lever in a rotating process is arranged at a position, corresponding to the measuring lever or a rotary center of the measuring lever, on the housing.

Further, the measuring lever includes a first-stage lever and a second-stage lever which are arranged at a front portion and a rear portion of the housing in the axial direction; a middle portion of the first-stage lever is rotatably mounted at an end of the housing through a rotary center component, a front end of the first-stage lever extends out of the housing to be connected to the measuring contactor, and a tail end of the first-stage lever corresponds to a front portion of the second-stage lever; a rotary center shaft enabling the second-stage lever to rotate inside the housing is arranged at the front portion of the second-stage lever; stirring pins keeping rotating in the same direction after being stirred by the tail end of the first-stage lever from different directions are arranged at the front portion of the second-stage lever and are corresponding to front and rear sides of the rotary center shaft, respectively; the moving grid is fixed onto a tail end of the second-stage lever; and an anti-slanting-swinging mechanism configured to limit slanting swinging of the rotary center shaft in a rotating process of the second-stage lever is arranged on the housing to limit slanting swinging of the second-stage lever in the rotating process, so as to ensure a constant gap between the fixing grid and the moving grid.

The beneficial effect of the above improved technical solution is as follow. In this field, the measurement accuracy cannot be ensured unless a constant gap between the fixing grid and the moving grid in the relative swinging process is kept. In the present invention, the anti-slanting-swinging mechanism is arranged to ensure the constant gap between the fixing grid and the moving grid in the relative swinging process, so that the measurement accuracy is ensured.

Further, the anti-slanting-swinging mechanism includes two limiting screws; a fixing plate on which the top of the rotary center shaft is rotatably mounted is arranged in the housing, and is correspondingly located above the rotary center shaft; the bottom of the rotary center shaft is rotatably mounted at a corresponding position on the housing; one of the limiting screws is mounted in the housing, is correspondingly located below the moving grid, and upwardly abuts against the bottom of the moving grid; and the other of the limiting screws is located on the fixing plate, and downwardly abuts against an upper surface of the first-stage lever.

Further, the anti-slanting-swinging mechanism includes two deep-groove ball bearings for limiting the slanting swinging of the rotary center shaft in the horizontal direction and in the vertical direction; and the two deep-groove ball bearings are located in the housing, are corresponding to an upper position and a lower position of the rotary center shaft, and sleeve an upper portion and a lower portion of the rotary center shaft, respectively.

Further, the anti-slanting-swinging mechanism includes two thrust ball bearings for limiting the slanting swinging of the rotary center shaft in the horizontal direction and in the vertical direction; and the two thrust ball bearings are located in the housing, are corresponding to an upper position and a lower position of the rotary center shaft, and sleeve the upper portion and a lower portion of the rotary center shaft, respectively.

Further, the anti-slanting-swinging mechanism includes two limiting shafts for limiting the slanting swinging of the rotary center shaft in the horizontal direction and in the vertical direction; a fixing plate on which the top of the rotary center shaft is rotatably mounted is arranged in the housing, and is correspondingly located above the rotary center shaft; the bottom of the rotary center shaft is rotatably mounted at a corresponding position on the housing; and the two limiting shafts are parallelly arranged in the housing and are corresponding to an upper position and a lower position of a middle portion of the second-stage lever.

Further, the anti-slanting-swinging mechanism is a guiding groove matching the tail end of the second-stage lever; a fixing plate on which the top of the rotary center shaft is rotatably mounted is arranged in the housing, and is correspondingly located above the rotary center shaft; the bottom of the rotary center shaft is rotatably mounted at a corresponding position on the housing; and the guiding groove is located at a position corresponding to the tail end of the second-stage lever in the housing, and the tail end of the second-stage lever reaches the interior of the guiding groove after extending outside the bottom of the moving grid.

The beneficial effect of the above further improved technical solution is as follow. Anti-slanting-swinging mechanisms of various forms are adopted to ensure the constant gap between the fixing grid and the moving grid during the relative swinging, meeting different production or measurement requirements.

Further, the lever indicator further includes a wire which recognizes a direction in which the first-stage lever stirs the second-stage lever; the bottom of the stirring pin close to the moving grid is erected on the second-stage lever through an insulating sleeve, one end of the wire is connected to the fixing grid, the other end of the wire is connected to the stirring pin close to the moving grid, and the fixing grid, the wire, the stirring pin close to the moving grid and the first-stage lever form a connected signal circuit or a disconnected signal circuit when the first-stage lever stirs the second-stage lever in different directions; and the microcontroller recognizes the direction in which the first-stage lever stirs the second-stage lever according to the connection and disconnection of the signal circuit, and amends a manufacturing or assembling error of components on two sides of the rotary center shaft in the axial direction of the housing.

The beneficial effect of the above further improved technical solution is as follow. The manufacturing or assembling error of the components on the two sides of the rotary center shaft is avoided by recognizing the swinging direction of the first-stage lever, so that the measurement accuracy is further improved.

Further, the measuring lever is a first-stage measuring lever, and the moving grid is fixed onto a tail end of the first-stage measuring lever; the anti-slanting-swinging mechanism includes two limiting screws; a fixing plate on which the top of the rotary center shaft is rotatably mounted is arranged in the housing, and is correspondingly located above the rotary center shaft; the bottom of the rotary center shaft is rotatably mounted at a corresponding position on the housing; one of the limiting screws is mounted in the housing, is correspondingly located below the moving grid, and upwardly abuts against the bottom of the moving grid; and the other of the limiting screws is located on the fixing plate, and downwardly abuts against an upper surface of the first-stage lever.

The beneficial effects of the above further improved technical solution are as follows. The measuring lever is simplified as a first-stage lever and is prevented from slanting swinging in measurement, so that the measurement accuracy is ensured while simplifying the structure of the lever indicator.

Further, the lever indicator further includes a wire which recognizes a swinging direction of the first-stage lever; a supporting plate is rotatably arranged in the housing through a rotating shaft, and is correspondingly located below a rear portion of the first-stage lever; a fixing plate on which the top of the rotating shaft is rotatably mounted is arranged in the housing, and is correspondingly located above the rotating shaft; the bottom of the rotating shaft is rotatably mounted at a corresponding position on the housing; stirring pins stirred by the first-stage lever from different directions are upwardly erected on the supporting plate, and are corresponding to two sides in the axial direction of a rotating center of the supporting plate; and the bottom of the stirring pin close to the moving grid is erected on the supporting plate through an insulating sleeve.

One end of the wire is connected to the fixing grid, the other end of the wire is connected to the stirring pin close to the moving grid, and the fixing grid, the wire, the stirring pin close to the moving grid and the first-stage lever form a connected signal circuit or a disconnected signal circuit when the first-stage lever stirs the supporting plate in different directions; and the microcontroller recognizes the swinging direction of the first-stage lever according to the connection and disconnection of the signal circuit, and amends a manufacturing or assembling error of components on two sides of a rotary center of the first-stage lever in the axial direction of the housing.

The beneficial effect of the above further improved technical solution is as follow. The manufacturing or assembling error of the components on the two sides of a rotary member is avoided by recognizing the swinging direction of the first-stage lever, so that the measurement accuracy is further improved.

Figure 1:
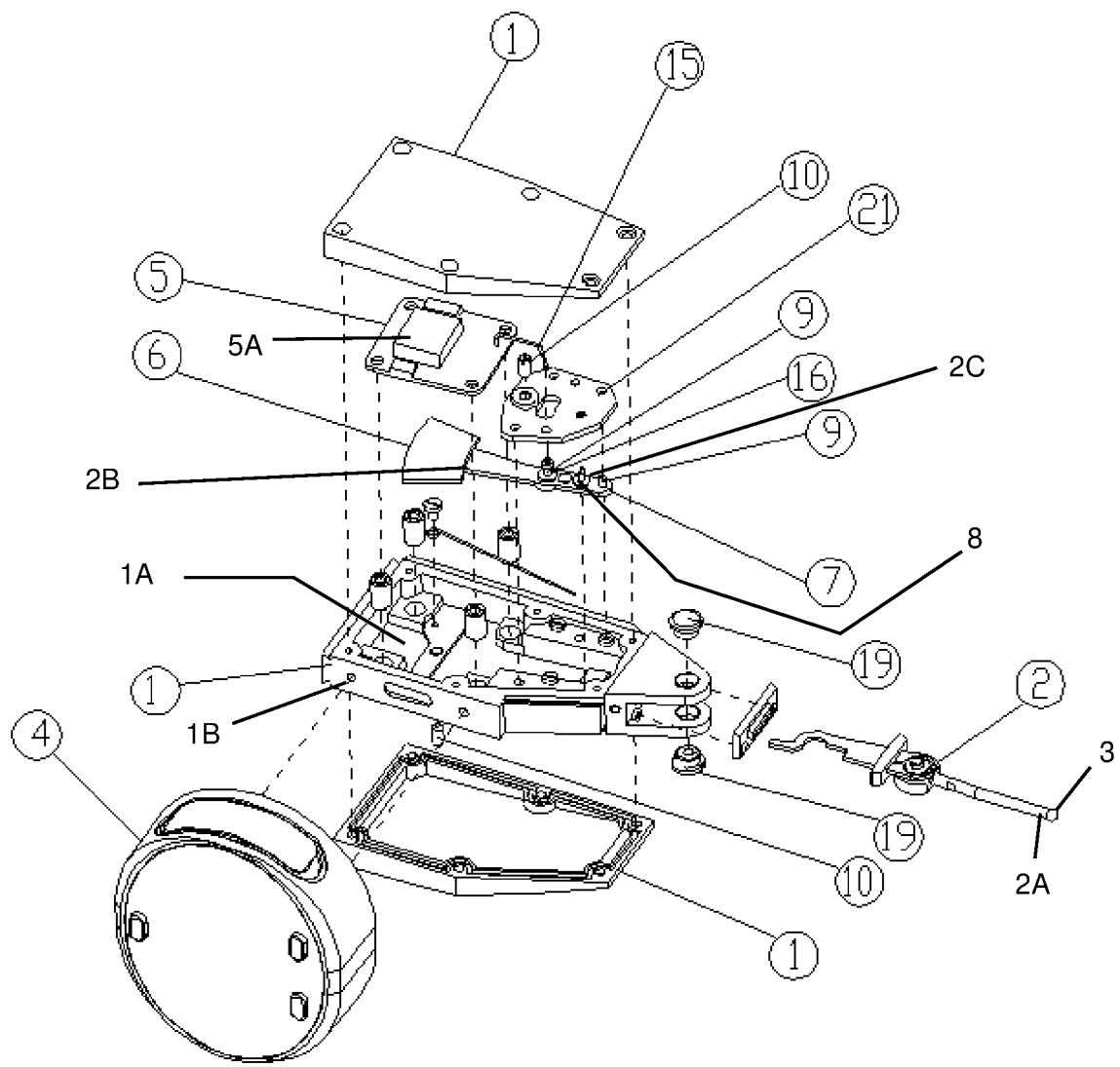
FIG. 1 is an exploded schematic view of a first embodiment.
Figure 2:
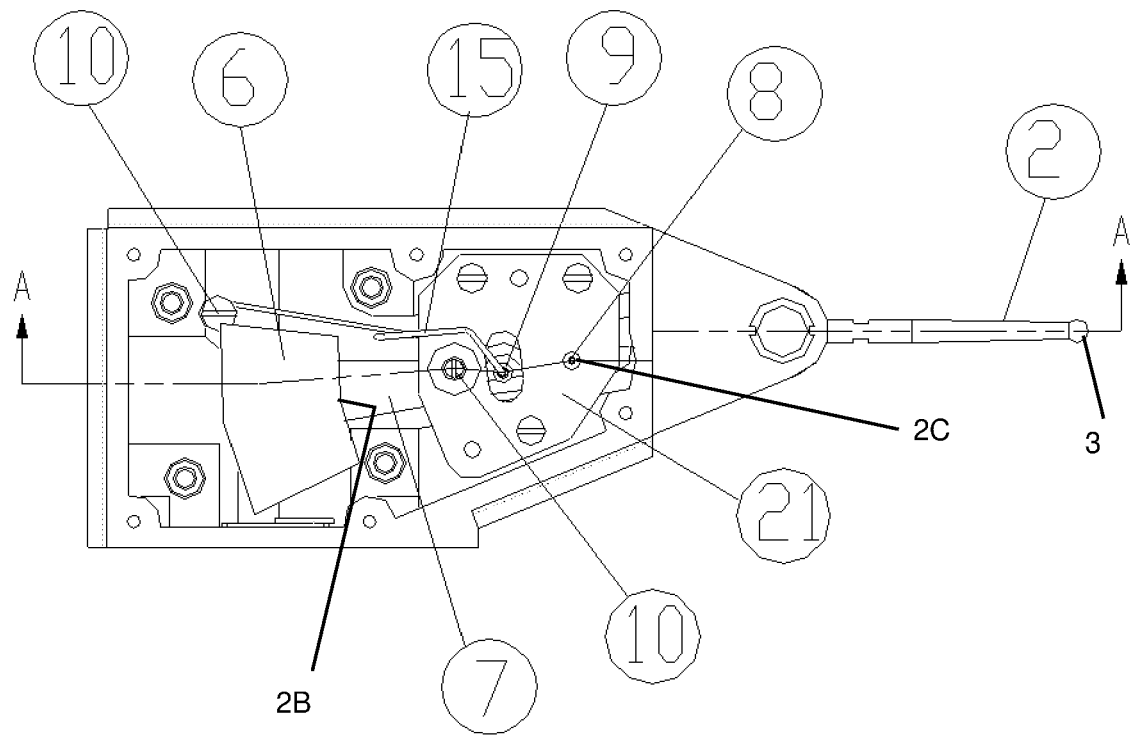
FIG. 2 is a top plan view of the first embodiment with such components as an upper cover and a fixing grid on the housing removed.
Figure 3:
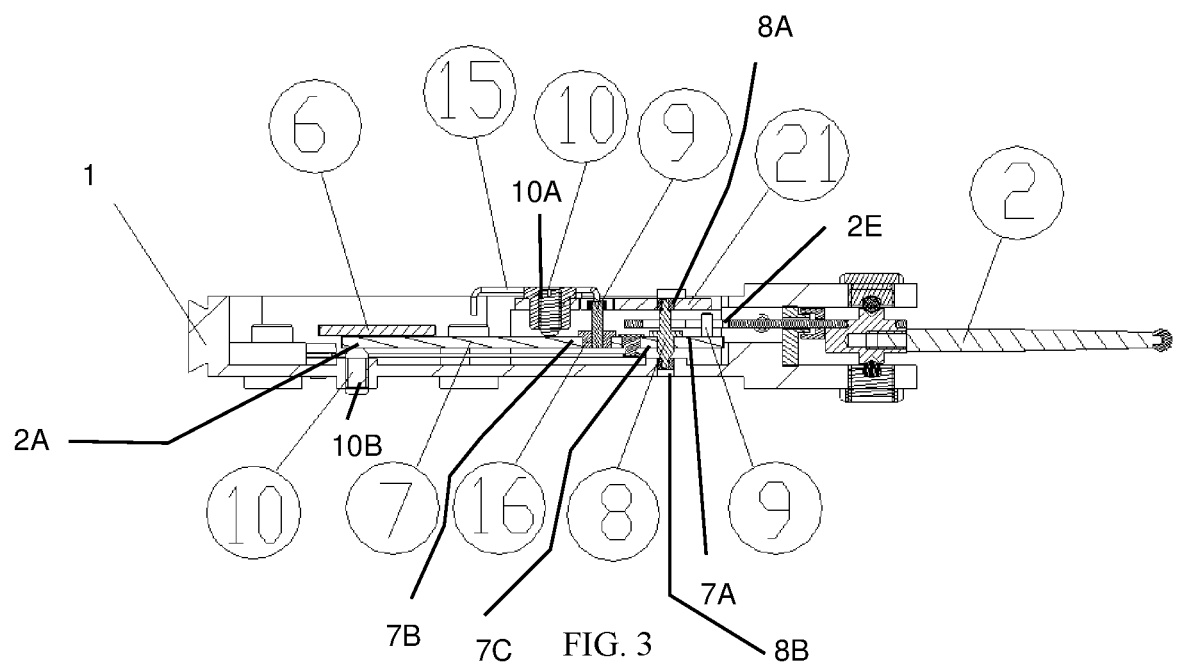
FIG. 3 is a sectional view taken along A-A of FIG. 2.

In the drawings, the list of components represented by reference numerals is as follows: 1, housing; 2, first-stage lever; 3, measuring contactor; 4, liquid crystal display; 5, fixing grid; 6, moving grid; 7, second-stage lever; 8, rotary center shaft; 9, stirring pin; 10, screw; 11, deep-groove ball bearing; 12, thrust ball bearing; 13, limiting shaft; 14, guiding groove; 15, wire; 16, insulating sleeve; 17, ball; 18, rotary member; 19, cover body; 20, supporting plate; and 21, fixing plate.

DETAILED DESCRIPTION OF THE INVENTION

The principles and features of the present invention are described below with reference to the accompanying drawings. Examples are only intended to illustrate the present invention and are not intended to limit the scope of the present invention.

First Embodiment

As shown in FIGS. 1-4, a lever indicator includes a housing 1 (having an inner volume 1A and an outer surface 1B), a measuring lever (having a front end 2A, a tail end 2B, and a tail end pivot point 2C), a displacement sensor and a microcontroller. The displacement sensor is located inside the housing 1; the measuring lever is rotatably mounted on the housing 1; a front end of the measuring lever extends out of the housing 1 to be provided with a measuring contactor 3; and after extending to the interior of the housing, a tail end of the measuring lever synchronously swings with the displacement sensor for measurement. The microcontroller 5A is located in the housing 1, and amends and calculates a measurement result according to a signal generated by the swinging of the displacement sensor. A liquid crystal display 4 for displaying the measurement result is further arranged outside the housing 1. The displacement sensor is any one of a capacitive grid sensor, a magnetic grid sensor or a CCD displacement sensor, and is composed of a fixing grid 5 and a moving grid 6 of a sector structure. The fixing grid 5 is fixed in the housing 1 and is correspondingly located above the tail end of the measuring lever; and the moving grid 6 is fixed onto the tail end of the measuring lever and swings relative to the fixing grid 5 after linked with the measuring lever. As the moving grid 6 performs rotary motion rather than translational motion with respect to the fixing grid 5, the moving grid 6 is designed to be of a sector structure. Thus, cells of the moving grid 6 are also designed to be sectorial.

An anti-slanting-swinging means 10, 10A, 10B, 11, 11A, 11B, 12, 12A, 12B, 13, 13A, 13B for the measuring lever during rotation around the tail end pivot point or mechanism for limiting slanting swinging of the measuring lever in a rotating process is arranged at a position, corresponding to the measuring lever or a rotary center of the measuring lever, on the housing 1. The anti-slanting-swing means 11 can be a first limiting screw 10A and second limiting screw 10B, or upper position deep-groove ball bearing 11A and lower position deep-groove ball bearing 11B, or upper position thrust ball bearing 12A and lower position thrust ball bearing 12B, or upper positioning limiting shaft 13A and lower positioning limiting shaft 13B.

The measuring lever includes a first-stage lever 2 (having front end first stage lever portion 2D, tail end first stage lever portion 2E, middle first stage portion 2F, first stage pivot point 2G) and a second-stage lever 7 (having front end second stage lever portion 7A, tail end second stage lever portion 7B, middle second stage portion 7C), which are arranged at a front portion and a rear portion of the housing 1 in the axial direction. The middle portion of the first-stage lever 2 is rotatably mounted at an end of the housing 1, the front end of the first-stage lever 2 extends out of the housing 1 to be connected to the measuring contactor 3, and the tail end of the first-stage lever 2 corresponds to a front portion of the second-stage lever 7. The tail end pivot point 2C is comprised of the rotary center shaft 8 attached to the middle second stage portion 7C, enabling the second-stage lever 7 to rotate inside the housing 1 is arranged at the front portion of the second-stage lever 7. The rotary shaft 8 has a top 8A and a bottom 8B. There are stirring pins 9 (first stage lever stirring pin 9A, second stage lever stirring pin 9B) keeping rotating in the same direction after being stirred by the tail end of the first-stage lever 2 from different directions are arranged at the front portion of the second-stage lever 7 and are corresponding to the front and rear sides of the rotary center shaft 8, respectively; the moving grid 6 is fixed onto the tail end of the second-stage lever 7; and an anti-slanting-swinging mechanism configured to limit slanting swinging of the rotary center shaft 8 in a rotating process of the second-stage lever 7 is arranged on the housing 1 to limit slanting swinging of the second-stage lever 7 in the rotating process, so as to ensure a constant gap between the fixing grid 5 and the moving grid 6. Specific details are as follows.

The anti-slanting-swinging mechanism includes two limiting screws 10; a fixing plate 21 on which the top of the rotary center shaft 8 is rotatably mounted is arranged in the housing 1, and is correspondingly located above the rotary center shaft 8; the bottom of the rotary center shaft 8 is rotatably mounted at a corresponding position on the housing 1; one of the limiting screws 10 is mounted in the housing 1, is correspondingly located below the moving grid 6, and upwardly abuts against the bottom of the moving grid 6; and the other of the limiting screws 10 is located on the fixing plate 21, and downwardly abuts against an upper surface of the first-stage lever 2. In a measurement process, as the moving grid 6 is fixed on the second-stage lever 7 to form an integral body, and is abutted against by the two limiting screws 10 upwards and downwards and clamped therebetween, when the moving grid 6 is rotated relative to the fixing grid 5 for measurement, the rotation of the moving grid 6 is confined between the two limiting screws 10. Under the action of the limiting screws 10, the moving grid 6 is unlikely to swing slantly, so that a constant gap between the moving grid 6 and the fixing grid 5 is kept, thereby ensuring the measurement accuracy (after swinging, the moving grid will return under the action of a restoration member such as a torsion spring, which belongs to the prior art and will not be repeated herein). In addition, the moving grid 6 in the lever indicator is directly fixed onto the second-stage lever 7, so that a whole precision motion transmission mechanism between a lever arm and the moving grid is eliminated. Thus, on one hand, the production cost is greatly reduced; and on the other hand, as there is no intermediate motion transmission mechanism between the lever arm and the moving grid, errors caused by multi-stage transmission are reduced, greatly improving the measurement accuracy.

In an existing lever indicator, manufacturing accuracy requirements on relatively rotating components on two sides of a rotary center of a measuring lever are very high, such as micron-level tolerance accuracy; or in order to meet requirements, it is required to repeatedly adjust to avoid manufacturing or assembling errors in an assembling process. However, if the component is required to achieve the micron-level tolerance accuracy such as IT1-level or IT2-level tolerance, the manufacturing cost of the component will be greatly increased. Therefore, in order to solve the above technical problems, currently, most of the mechanical lever indicators are currently adjusted by professional technicians, which is very demanding for relevant personnel, so they need to be trained for a long time. The present invention solves the above technical problems by the following solutions.

Figure 4:
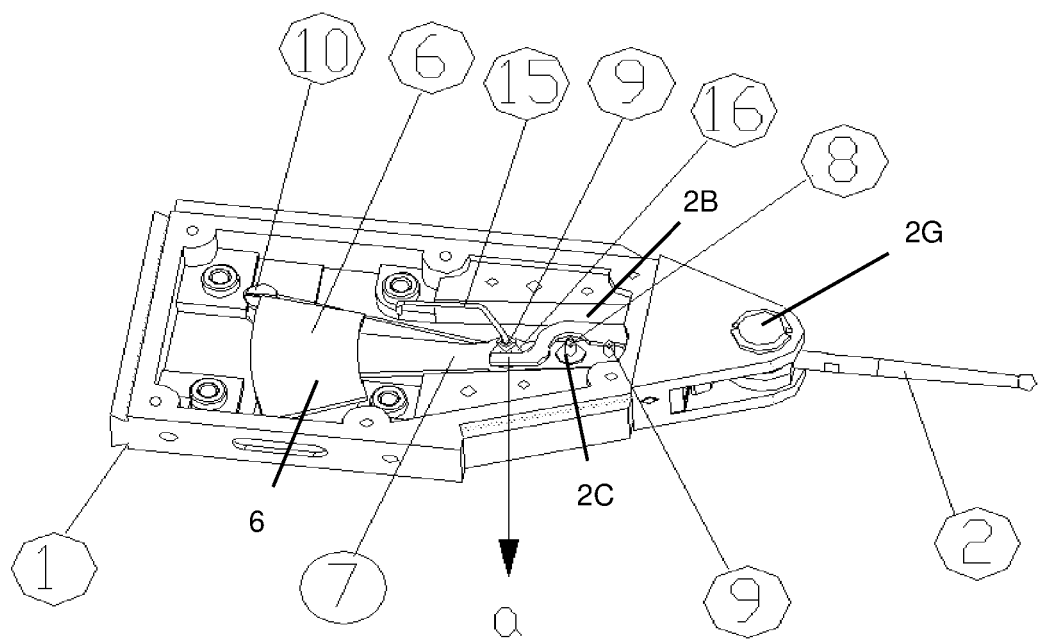
FIG. 4 is a three-dimensional schematic view of FIG. 2 with a fixing plate removed.

The lever indicator further includes a wire 15 which recognizes a direction in which the first-stage lever 2 stirs the second-stage lever 7. The bottom of the stirring pin 9 close to the moving grid 6 is erected on the second-stage lever 7 through an insulating sleeve 16, one end of the wire 15 is connected to the fixing grid 5, the other end of the wire 15 is connected to the stirring pin 9 close to the moving grid 6, and the fixing grid 5, the wire 15, the stirring pin 9 close to the moving grid 6 and the first-stage lever 2 form a connected signal circuit or a disconnected signal circuit in a condition that the first-stage lever 2 stirs the second-stage lever 7 in different directions; and the microcontroller recognizes the direction in which the first-stage lever 2 stirs the second-stage lever 7 according to the connection and disconnection of the signal circuit, and amends a manufacturing or assembling error of components on two sides of the rotary center shaft 28 in the axial direction of the housing 1. Referring to FIG. 4, when the tail end of the first-stage lever 2 is rotated in a direction a (the first-stage lever 2 stirs the stirring pin 9 away from the moving grid 6), the tail end of the first-stage lever 2 is away from the stirring pin 9 close to the moving grid 6. As the insulating sleeve 16 is arranged at the bottom of the stirring pin 9, when the tail end of the first-stage lever 2 is separated from the stirring pin 9 close to the moving grid 6, a state of the signal circuit formed by the fixing grid 5, the wire 15, the stirring pin 9 close to the moving grid 6, and the first-stage lever 2 is changed from connection to disconnection. Conversely, when the tail end of the first-stage lever 2 is rotated in a direction opposite to the direction a (the first-stage lever 2 stirs the stirring pin 9 close to the moving grid 6), the tail end of the first-stage lever 2 will always cling to the stirring pin 9 close to the moving grid 6 in the whole rotating process, so that the signal circuit will remain in the connection state. The microcontroller can recognize the rotation direction of the first-stage lever 2 according to the change of the state of the signal circuit, and then amends the manufacturing or assembling error of the components on the two sides of the rotary center (rotary center shaft 8) of the second-stage lever 7, respectively, so that an accuracy error is avoided eventually. In summary, through the added wire 15, the microcontroller recognizes the swinging direction of the first-stage lever 2 to avoid the manufacturing or assembling error of the components on the two sides of the rotary center shaft, so that the requirements of manufacturing and assembling accuracy of the components are reduced while ensuring the measurement accuracy. In addition, professional technicians do not need to repeatedly adjust, greatly reducing the production and manufacturing costs.

In addition, in this field, as the sensor moving grid 6 is directly fixed on the measuring lever arm, the fixing position of the moving grid 6 determines an amplification ratio of the lever indicator in measurement, and it is difficult to ensure that the fixing positions of all moving grids 6 are completely the same in a mass production process, an amplification ratio error is generated and product accuracy is adversely affected. In the present invention, the provided microcontroller is adopted to amend a coefficient of the amplification ratio of each lever indicator, so that the accuracy of the amplification ratio of the measuring lever is ensured. Thus, in the production process, the mounting position requirement of the moving grid 6 on the measuring lever arm is not strict, so that the assembling difficulty is reduced, greatly reducing the manufacturing cost.

Second Embodiment

Figure 5:
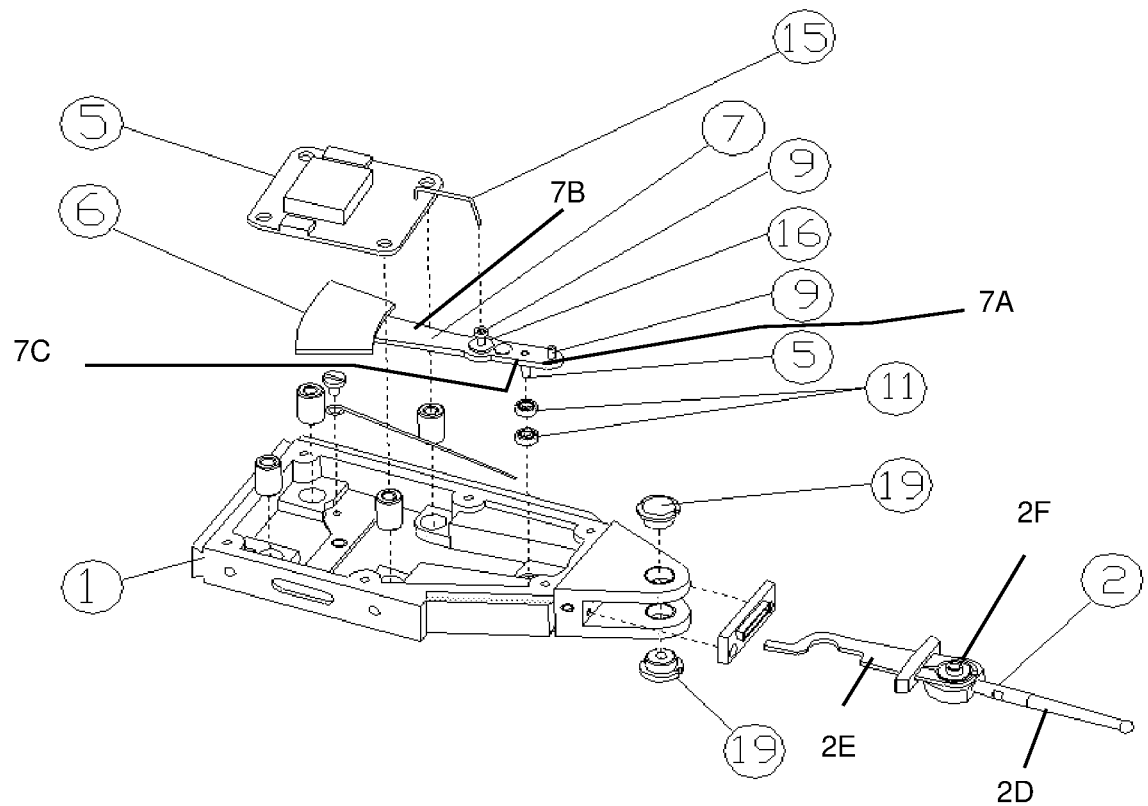
FIG. 5 is an exploded schematic view of a second embodiment (with such components as the upper cover and a lower cover of the housing, and a liquid crystal display removed).
Figure 6:
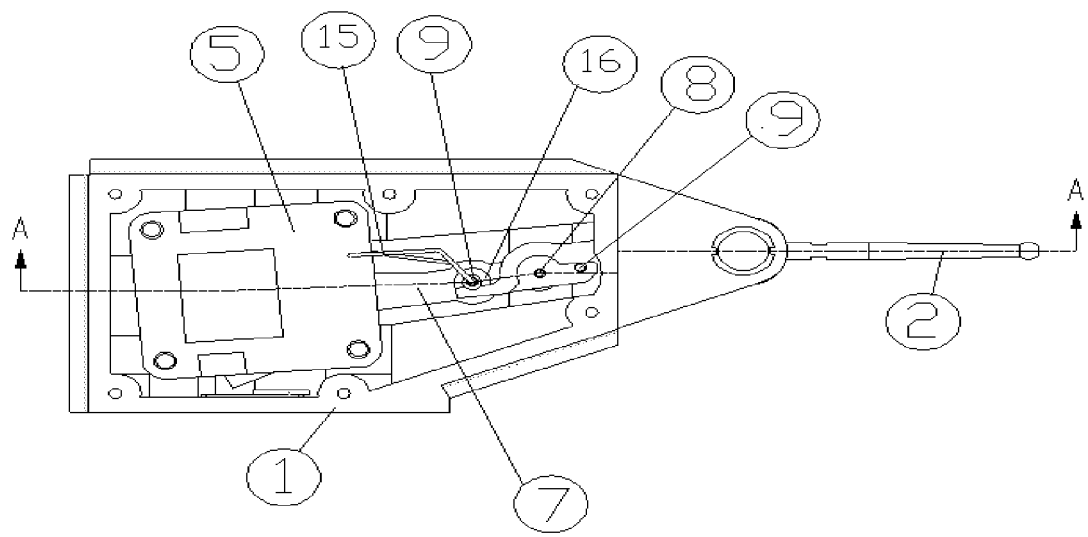
FIG. 6 is a top plan view of the second embodiment with the upper cover of the housing removed.
Figure 7:
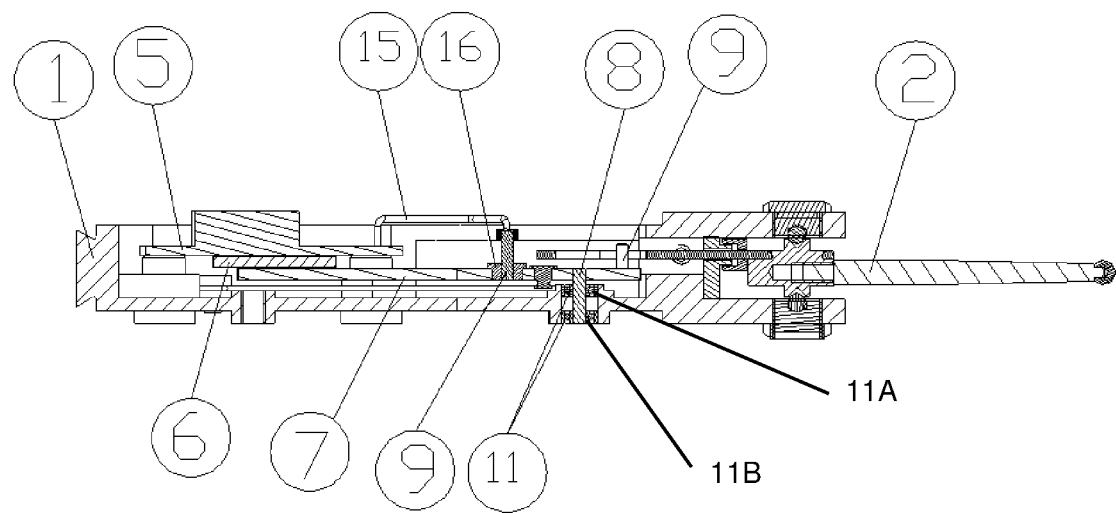
FIG. 7 is a sectional view taken along A-A of FIG. 6.

In this embodiment, the anti-slanting-swinging mechanism is changed, and other structures are the same as those in the first embodiment. As shown in FIGS. 5-7, the anti-slanting-swinging mechanism includes two deep-groove ball bearings 11 for limiting slanting swinging of the rotary center shaft 8 in the horizontal direction and in the vertical direction; and the two deep-groove ball bearings 11 are located in the housing 1, are corresponding to an upper position and a lower position of the rotary center shaft 8, and sleeve the upper portion and the lower portion of the rotary center shaft 8, respectively. Due to its structural characteristics, an inner ring of the deep-groove ball bearing 11 is fixed in the radial direction, namely, in the horizontal direction, and can slide vertically (namely, slides to the top and bottom dead points) in the axial direction, namely, in the vertical direction. Therefore, the first deep-groove ball bearing 11 sleeves the rotary center shaft 8 to limit the slanting swinging of the rotary center shaft 8 in the horizontal direction. When the second deep-groove ball bearing 11 is mounted, regardless of whether the second deep-groove ball bearing 11 is located above or below the first deep-groove ball bearing 11, all that is needed is to ensure that the inner ring of the second deep-groove ball bearing 11 and the inner ring of the first deep-groove ball bearing 11 are staggered. For example, if the inner ring of the first deep-groove ball bearing 11 is located at the top dead point, the inner ring of the second deep-groove ball bearing 11 is located at the bottom dead point. The inner rings of the two deep-groove ball bearings cannot slide vertically in the vertical direction under the interaction of the inner rings, so that the slanting swinging of the rotary center shaft 8 in the horizontal direction and in the vertical direction is limited. As long as the rotary center shaft 8 does not swing slantingly, the constant gap between the moving grid 6 and the fixing grid 5 can be kept during the rotation of the moving grid 6, so that the measurement accuracy is ensured eventually.

Third Embodiment

Figure 8:
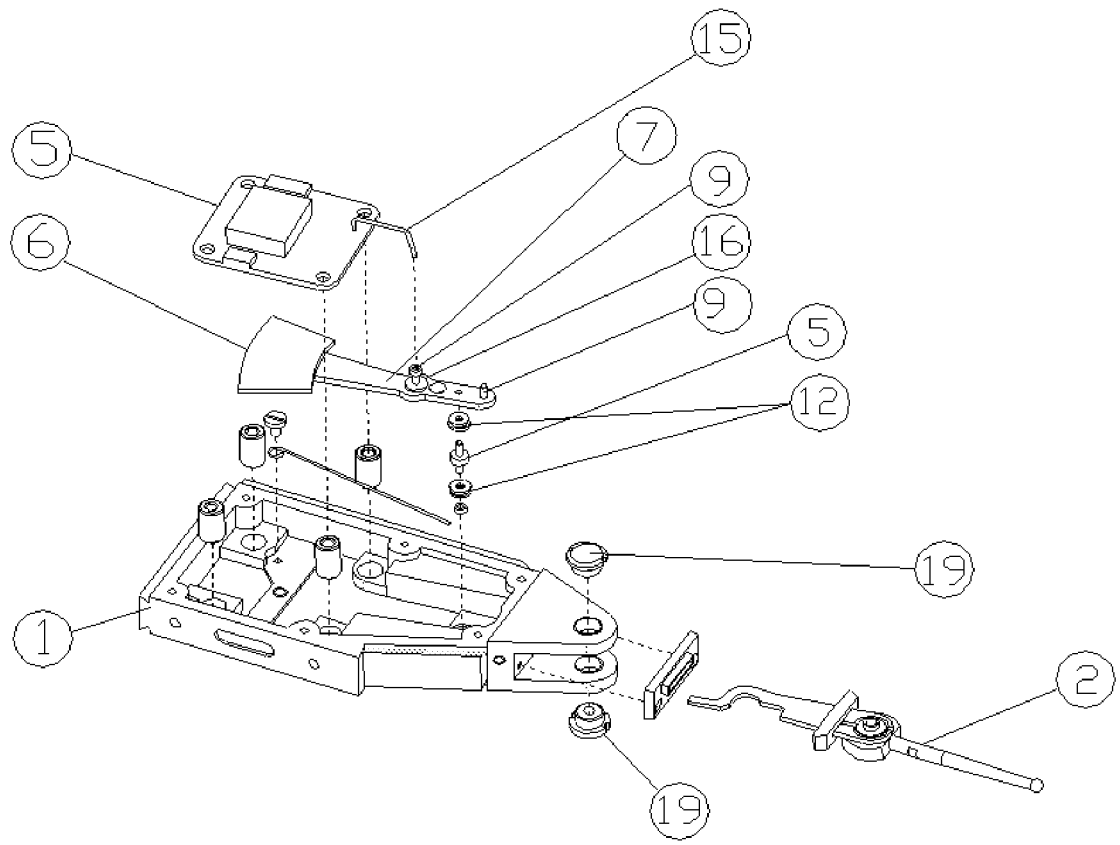
FIG. 8 is an exploded schematic view of a third embodiment (with such components as the upper cover and the lower cover of the housing and the liquid crystal display removed).
Figure 9:
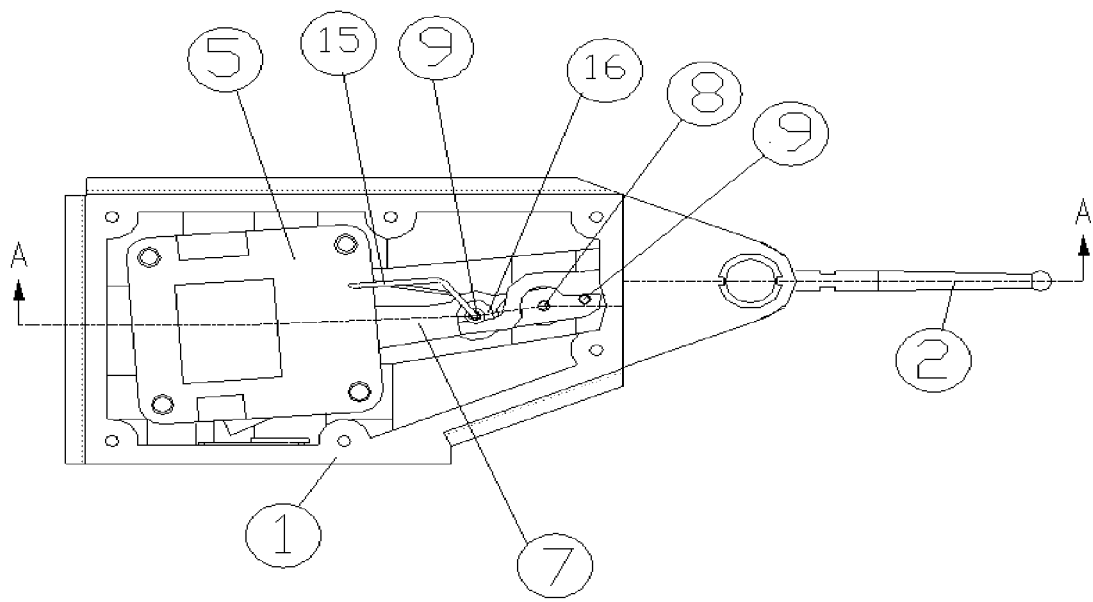
FIG. 9 is a top plan view of the third embodiment with the upper cover of the housing removed.
Figure 10:
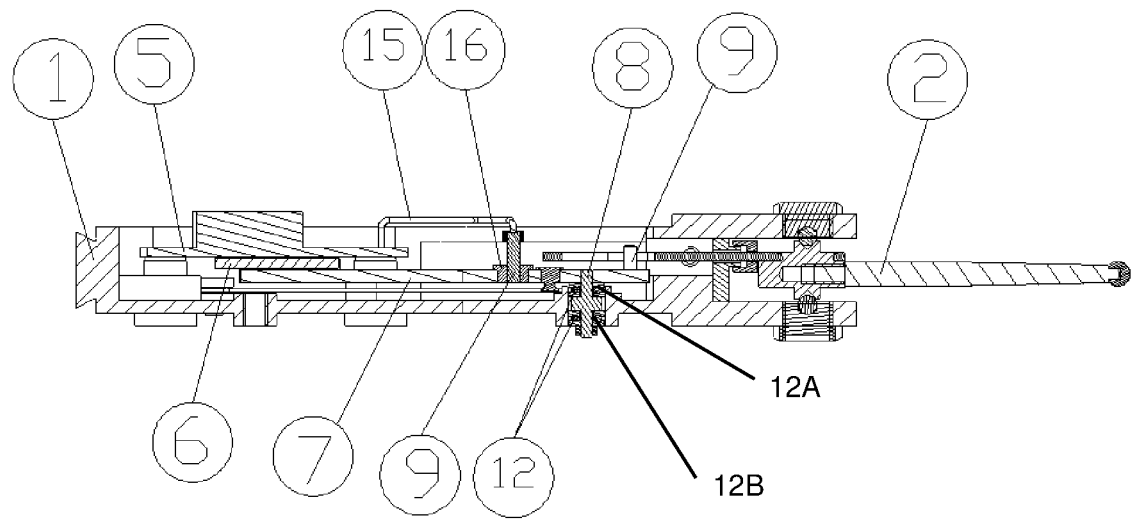
FIG. 10 is a sectional view taken along A-A of FIG. 9.

In this embodiment, the anti-slanting-swinging mechanism is changed, and other structures are the same as those in the first embodiment. As shown in FIGS. 8-10, the anti-slanting-swinging mechanism includes two thrust ball bearings 12 for limiting slanting swinging of the rotary center shaft 8 in the horizontal direction and in the vertical direction; and the two thrust ball bearings 12 are located in the housing 1, are corresponding to an upper position and a lower position of the rotary center shaft 8, and sleeve the upper portion and the lower portion of the rotary center shaft 8, respectively. Due to its structural characteristics, an inner ring of the thrust ball bearing 12 is fixed in the axial direction, namely, in the vertical direction, and can slide transversely (namely, slides to the left and right dead points) in the radial direction, namely, in the horizontal direction. Therefore, the first thrust ball bearing 12 sleeves the rotary center shaft 8 to limit the slanting swinging of the rotary center shaft 8 in the vertical direction. When the second thrust ball bearing 12 is mounted, regardless of whether the second thrust ball bearing 12 is located above or below the first thrust ball bearing 12, all that is needed is to ensure that the inner ring of the second thrust ball bearing 12 and the inner ring of the first thrust ball bearing 12 are staggered. For example, if the inner ring of the first thrust ball bearing 12 is located at the left dead point, the inner ring of the second thrust ball bearing 12 is located at the right dead point. The inner rings of the two deep-groove ball bearings cannot slide transversely in the horizontal direction under the interaction of the inner rings, so that the slanting swinging of the rotary center shaft 8 in the horizontal direction and in the vertical direction is limited. As long as the rotary center shaft 8 does not swing slantingly, the constant gap between the moving grid 6 and the fixing grid 5 can be kept during the rotation of the moving grid 6, so that the measurement accuracy is ensured eventually.

Fourth Embodiment

Figure 11:
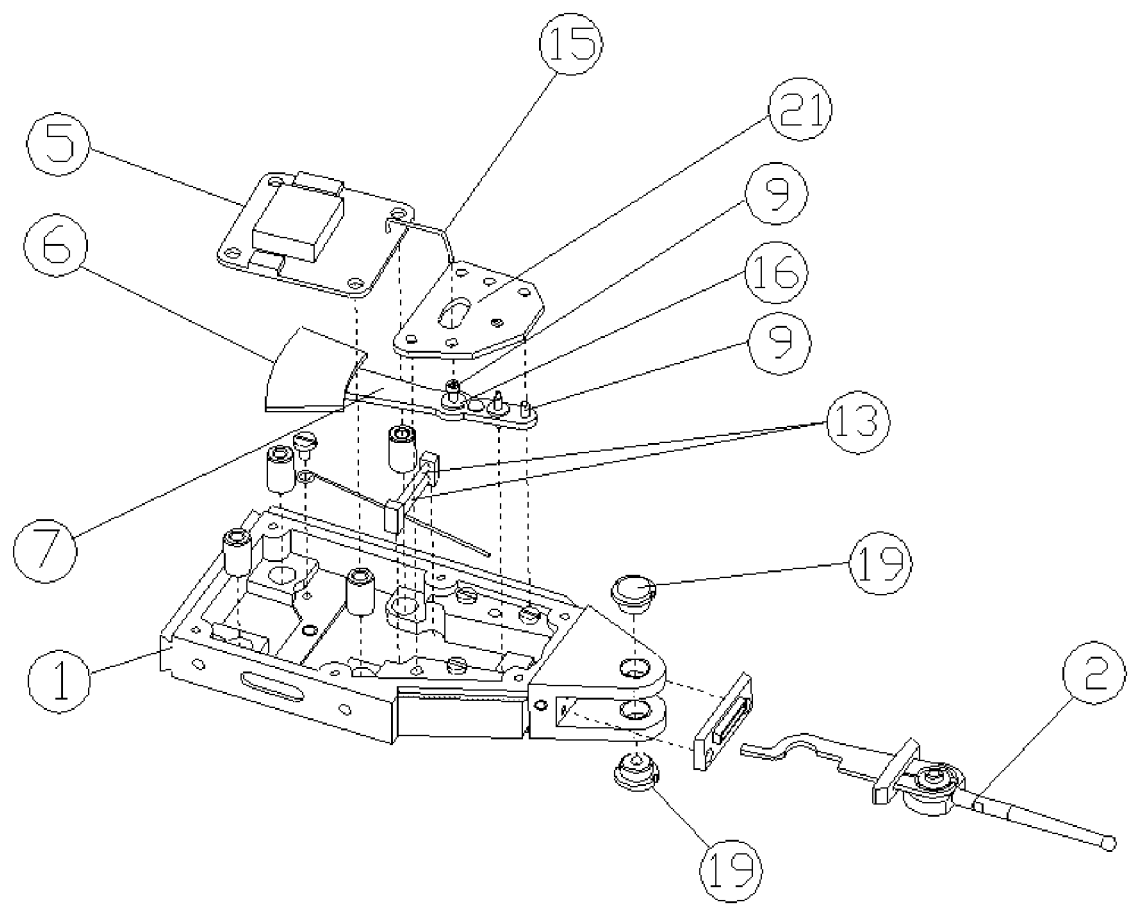
FIG. 11 is an exploded schematic view of a fourth embodiment (with such components as the upper cover and the lower cover of the housing and the liquid crystal display removed).
Figure 12:
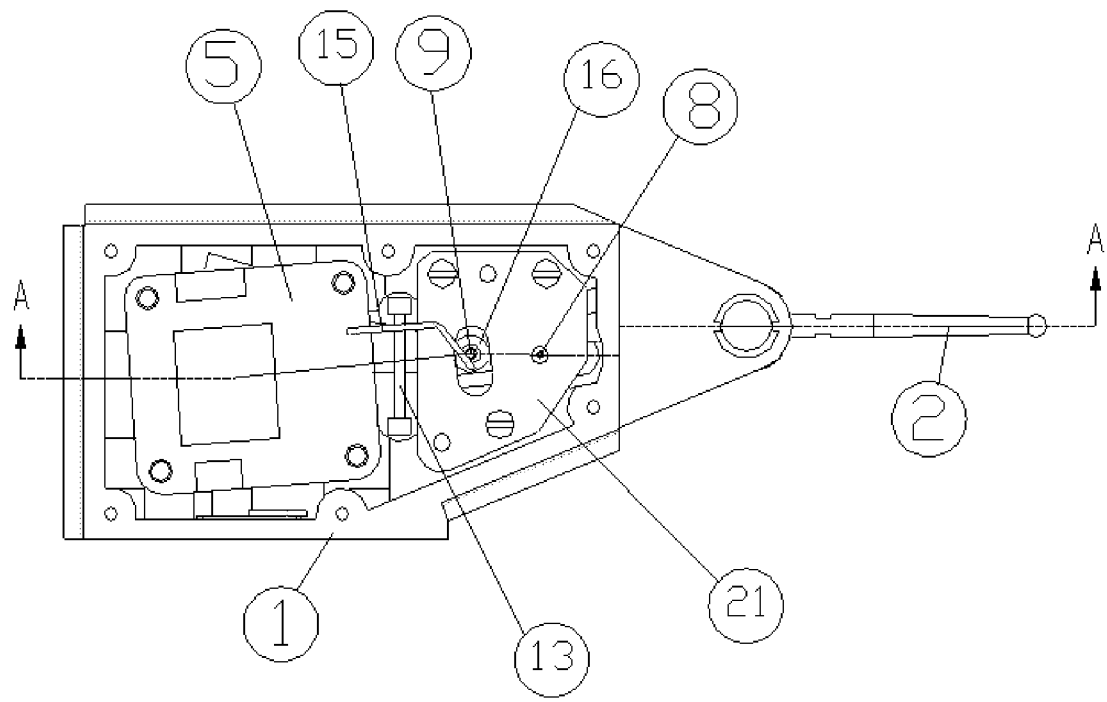
FIG. 12 is a top plan view of the fourth embodiment with the upper cover of the housing removed.
Figure 13:
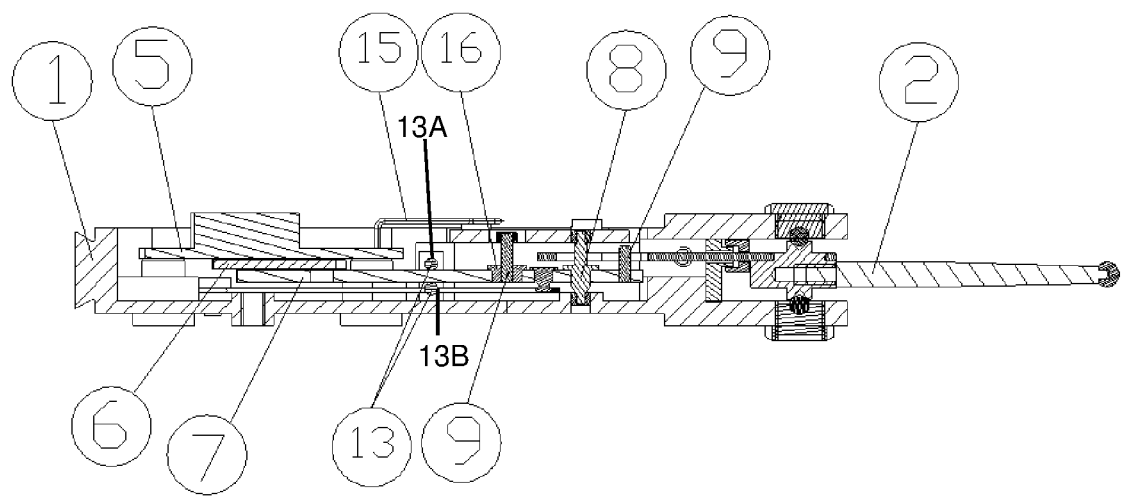
FIG. 13 is a sectional view taken along A-A of FIG. 12.

In this embodiment, the anti-slanting-swinging mechanism is changed, and other structures are the same as those in the first embodiment 1. As shown in FIGS. 11-13, the anti-slanting-swinging mechanism includes two limiting shafts 13 for limiting slanting swinging of the rotary center shaft 8 in the horizontal direction and in the vertical direction; a fixing plate 21 on which the top of the rotary center shaft 8 is rotatably mounted is arranged in the housing 1, and is correspondingly located above the rotary center shaft 8; the bottom of the rotary center shaft 8 is rotatably mounted at a corresponding position on the housing 1; and the two limiting shafts 13 are parallelly arranged in the housing 1 and are corresponding to an upper position and a lower position of the middle portion of the second-stage lever 7. The second-stage lever 7 is located between the two limiting shafts 13, and a distance between the limiting shafts 13 is matched with the second-stage lever 7, so that the second-stage lever 7 can only be rotated between the two limiting shafts 13, limiting the slanting swinging of the second-stage lever 7. As the second-stage lever 7 and the moving grid 6 have the same rotary center (the rotary center shaft 8), the second-stage lever 7 and the moving grid 6 have no relative motion during the measurement. On the premise that the second-stage lever 7 does not slanting swing, it is possible to keep the constant gap between the moving grid 6 and the fixing grid 5 during the rotation of the moving grid 6, so that the measurement accuracy is ensured eventually.

Fifth Embodiment

Figure 14:
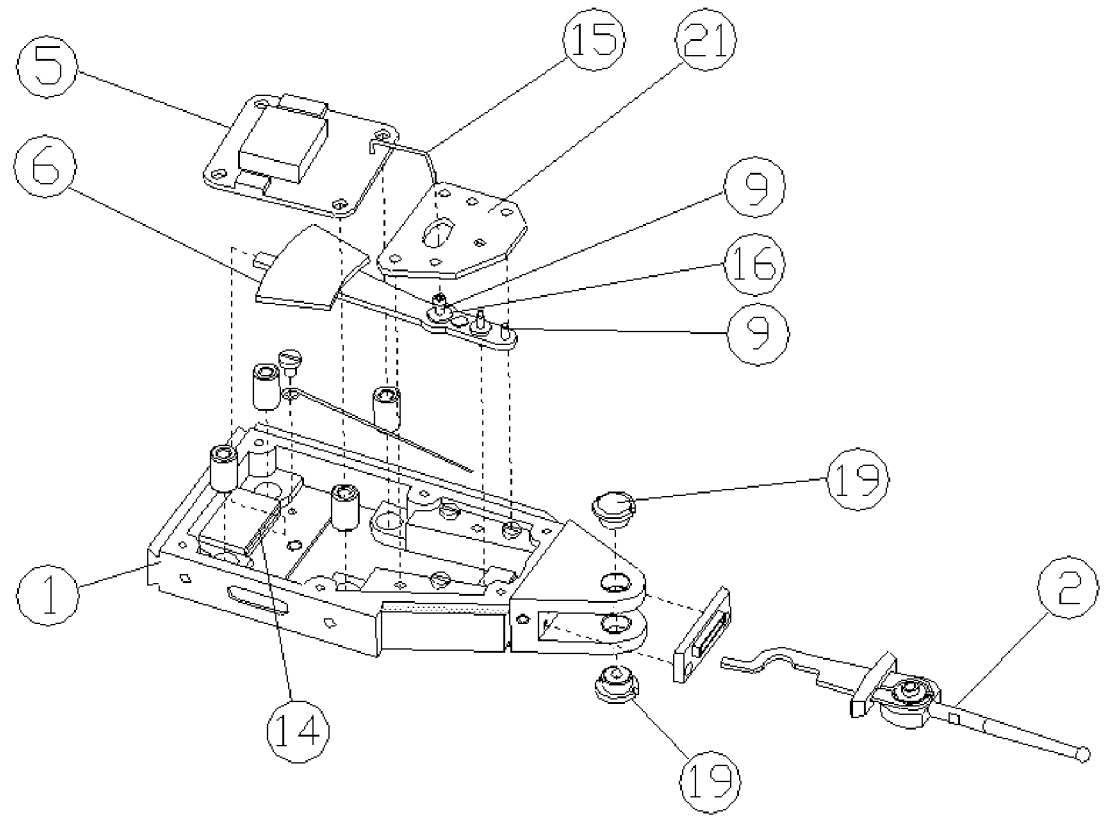
FIG. 14 is an exploded schematic view of a fifth embodiment (with such components as the upper cover and the lower cover of the housing and the liquid crystal display removed).
Figure 15:
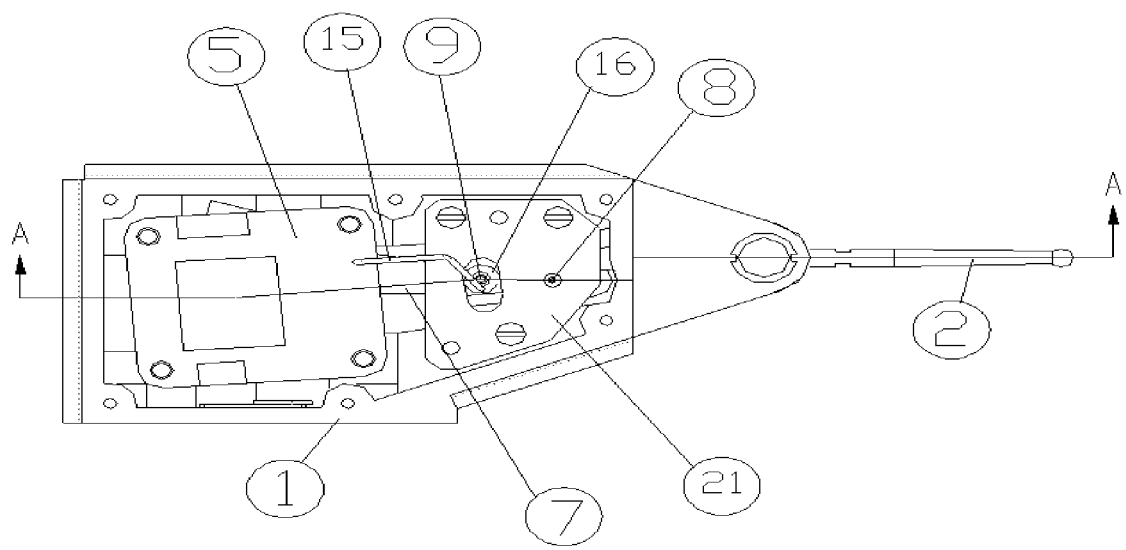
FIG. 15 is a top plan view of the fifth embodiment with the upper cover of the housing removed.
Figure 16:
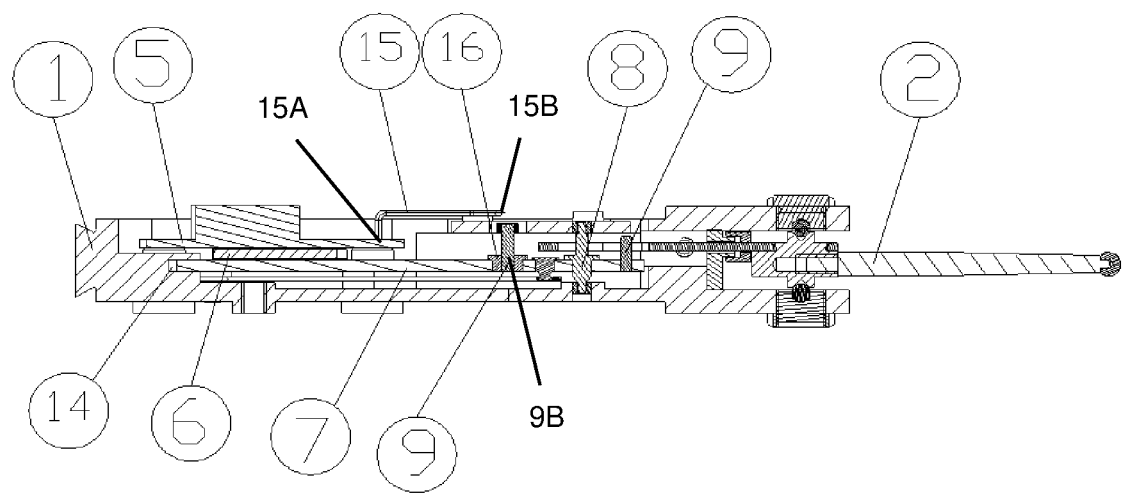
FIG. 16 is a sectional view taken along A-A of FIG. 15.

In this embodiment, the anti-slanting-swinging mechanism is changed, and other structures are the same as those in the first Embodiment. As shown in FIGS. 14-16, the anti-slanting-swinging mechanism is a guiding groove 14 matching the tail end of the second-stage lever 7; a fixing plate 21 on which the top of the rotary center shaft 8 is rotatably mounted is arranged in the housing 1, and is correspondingly located above the rotary center shaft 8; the bottom of the rotary center shaft 8 is rotatably mounted at a corresponding position on the housing 1; and the guiding groove 14 is located at a position corresponding to the tail end of the second-stage lever 7 in the housing 1, and the tail end of the second-stage lever 7 reaches the interior of the guiding groove 14 after extending outside the bottom of the moving grid 6. A cavity of the guiding groove 14 is matched with the moving grid 6. The tail end of the moving grid 6 is located in the cavity of the guiding groove 14 and swings under the guiding of the guiding groove 14, the constant gap between the moving grid 6 and the fixing grid 5 during the rotation of the moving grid 6 can be kept, so that the measurement accuracy is ensured eventually.

Sixth Embodiment

Figure 17:
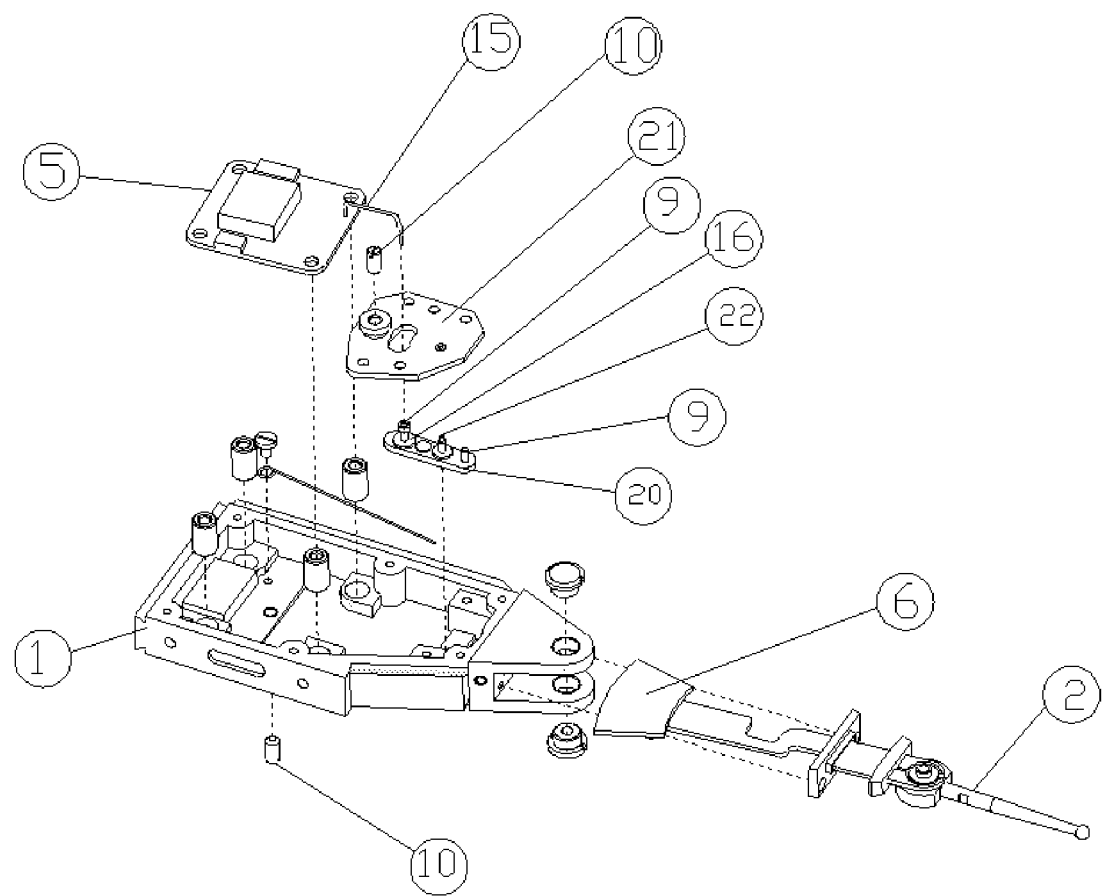
FIG. 17 is an exploded schematic view of a sixth embodiment (with such components as the upper cover and the lower cover of the housing and the liquid crystal display removed).
Figure 18:
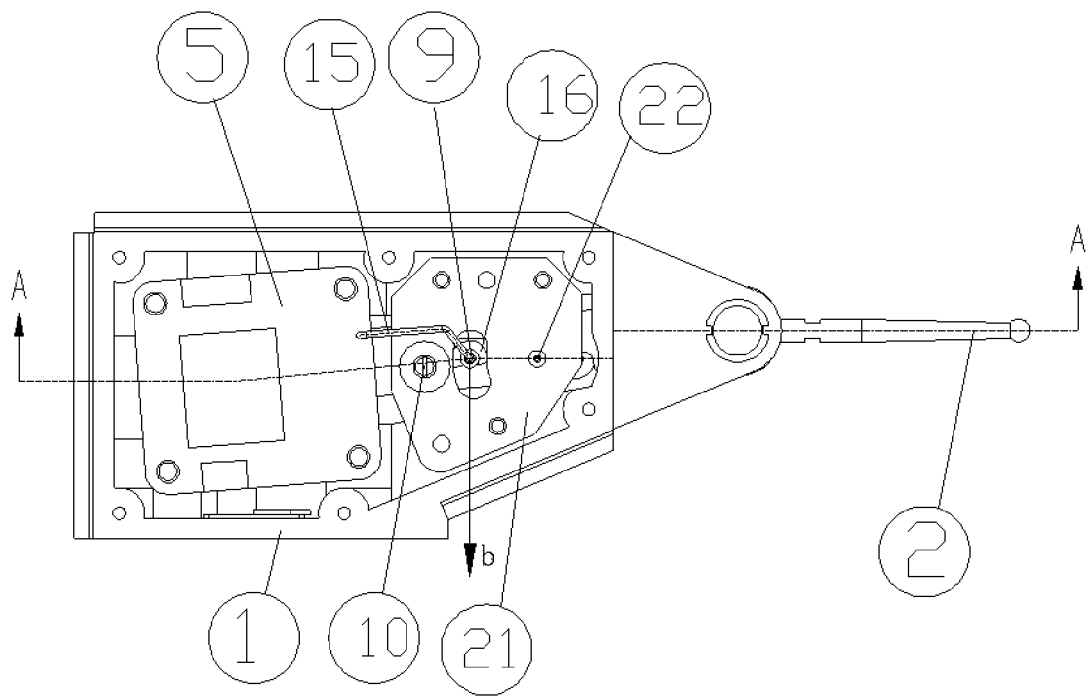
FIG. 18 is a top plan view of the sixth embodiment with the upper cover of the housing removed.
Figure 19:
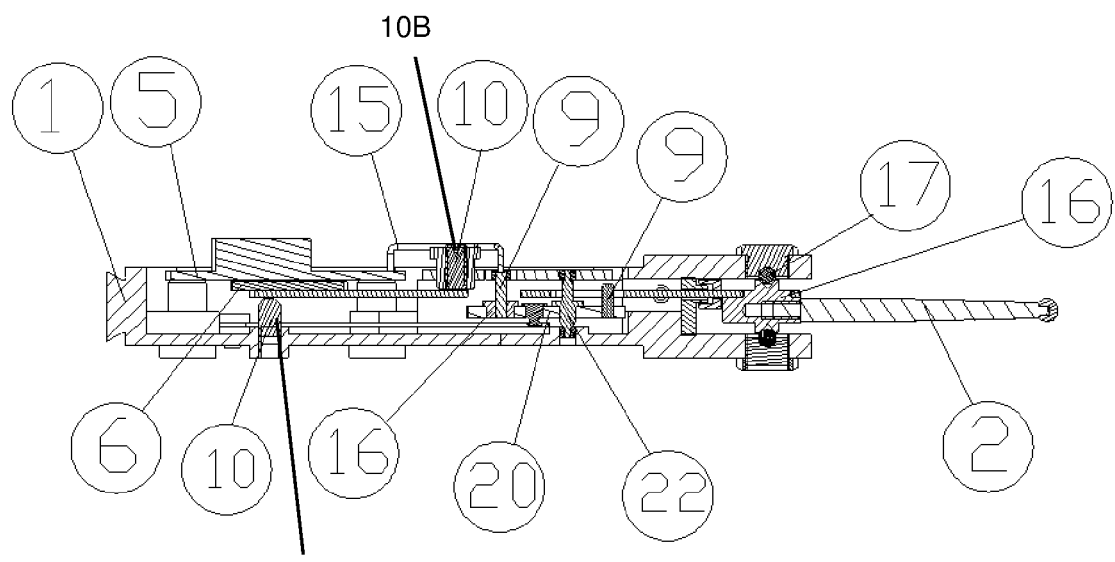
FIG. 19 is a sectional view taken along A-A of FIG. 18.
Figure 20:
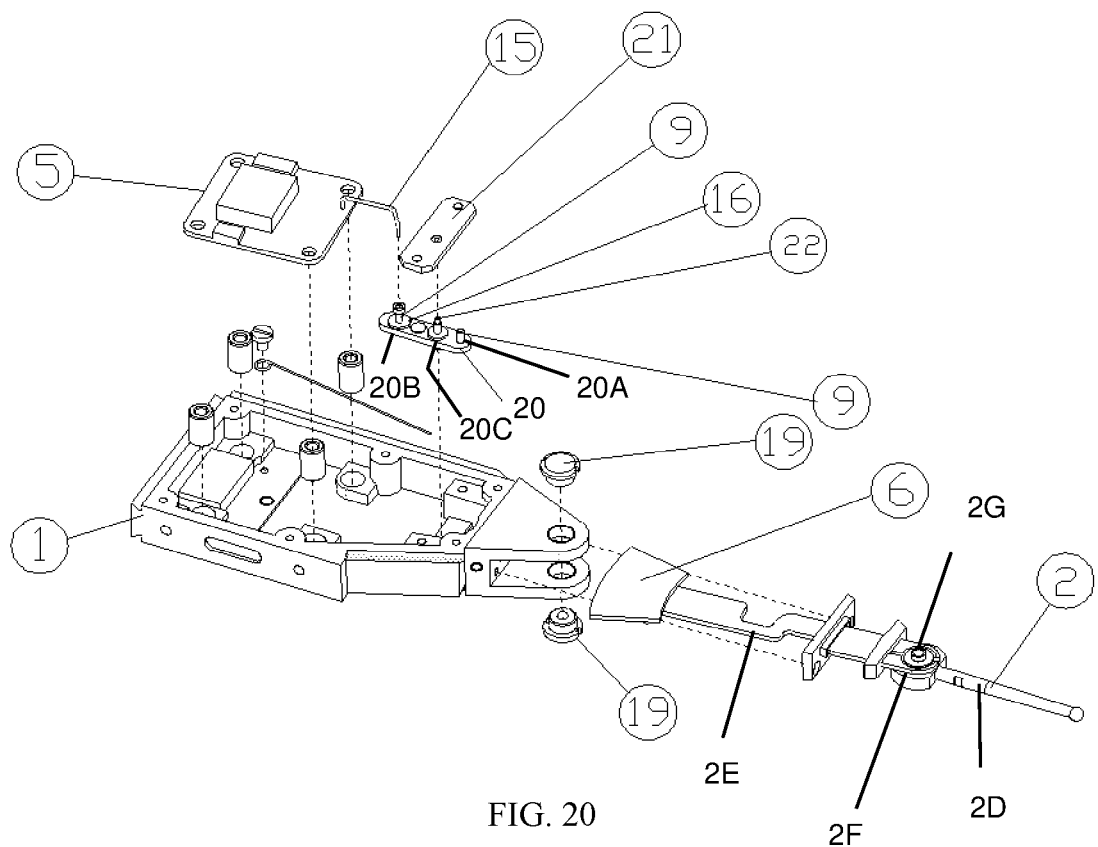
FIG. 20 is an exploded schematic view of a seventh embodiment (with such components as the upper cover and the lower cover of the housing and the liquid crystal display removed).
Figure 21:
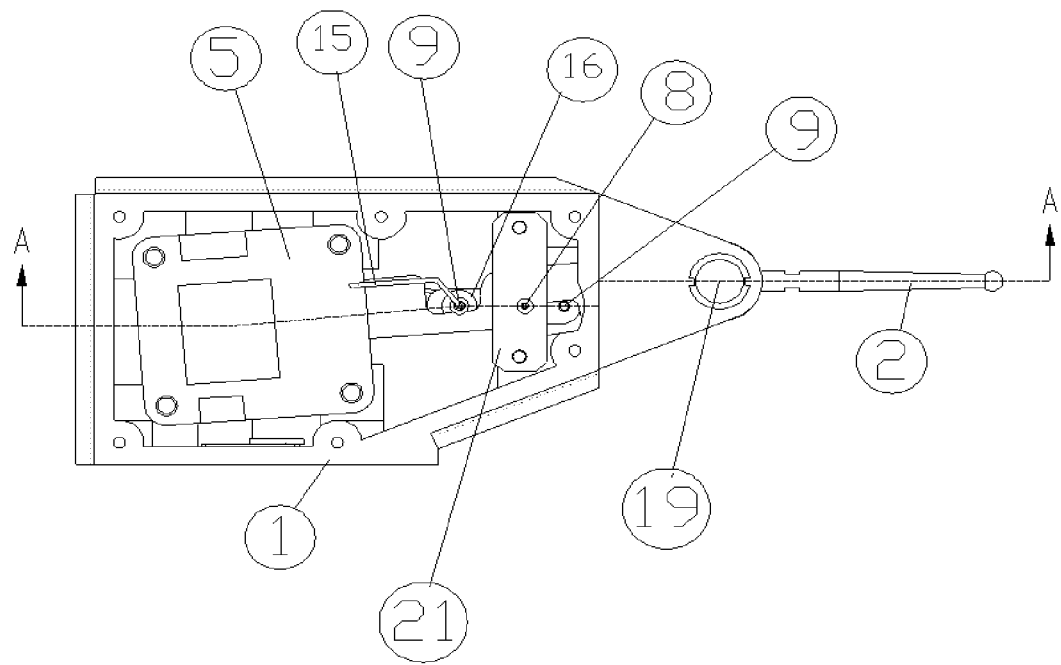
FIG. 21 is a top plan view of the seventh embodiment with the upper cover of the housing removed.
Figure 22:
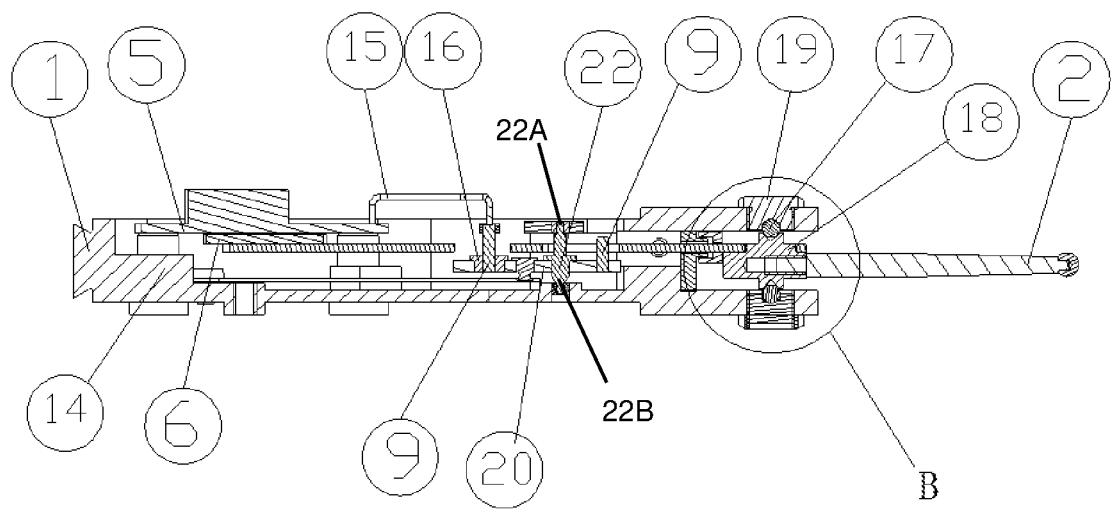
FIG. 22 is a sectional view taken along A-A of FIG. 21.
Figure 23:
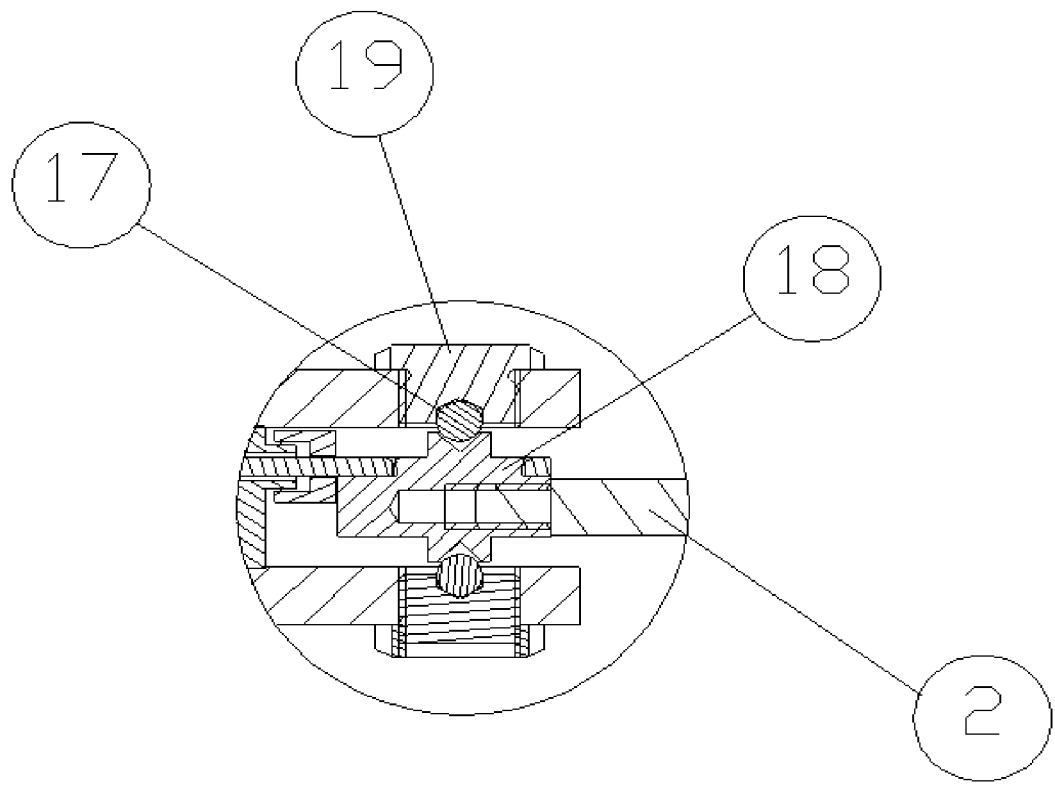
FIG. 23 is an enlarged schematic view of a detail B shown in FIG. 22.

As shown in FIGS. 17-19, the measuring lever is a first-stage measuring lever 2, and the moving grid 6 is fixed onto the tail end of the first-stage measuring lever 2; the anti-slanting-swinging mechanism includes two limiting screws 10; a fixing plate 21 on which the top of the rotary center shaft 8 is rotatably mounted is arranged in the housing 1, and is correspondingly located above the rotary center shaft 8; the bottom of the rotary center shaft 8 is rotatably mounted at a corresponding position on the housing 1; one of the limiting screws 10 is mounted in the housing 1, is correspondingly located below the moving grid 6, and upwardly abuts against the bottom of the moving grid 6; and the other of the limiting screws 10 is located on the fixing plate 21, and downwardly abuts against the upper surface of the first-stage measuring lever 2. The anti-slanting-swinging principle of this embodiment is the same as that of the first embodiment. This embodiment can ensure the constant gap between the moving grid 6 and the fixing grid 5 during the rotation, so that the measurement accuracy is improved. In addition, in this embodiment, the moving grid 6 is fixed onto the tail end of the first-stage measuring lever 2, so that the second-stage lever is eliminated, enabling the entire mechanical structure to be simpler. After the second-stage lever is eliminated, the measuring contactor 3 and the moving grid 6 swing in opposite directions, and the zero position of the lever indicator is located at the middle, rather than one side in the first to fifth embodiments. Therefore, when it is required to reach the same range under the same condition, all that is needed is to slightly enlarge the size of the lever indicator in this embodiment. As there is only the first-stage transmission, the measurement accuracy is greatly improved. In addition, the lever indicator of the first-stage lever structure can adopt the anti-slanting-swinging mechanism of any of the above second to fifth embodiments according to actual needs to ensure the constant gap between the moving grid 6 and the fixing grid 5 during the rotation, so as to improve the measurement accuracy.

As described above, the present invention reduces the manufacturing and assembling accuracy requirements of the components by providing the wire 15. The specific details are as follows.

A supporting plate 20 (being comprised of a front end support plate portion 20A, a tail end support plate portion 20B opposite the front end support plate portion, and a middle support plate portion 20C between the front end support plate portion and the tail end support plate portion) is rotatably arranged in the housing 1 through a rotating shaft 22 (having a top 22A rotatably mounted in the fixing plate and a bottom 22B rotatably mounted at a corresponding position on the housing), and is correspondingly located below the rear portion of the first-stage lever 2. A fixing plate 21 on which the top of the rotating shaft 22 is rotatably mounted is arranged in the housing 1, and is correspondingly located above the rotating shaft 22. The bottom of the rotating shaft 22 is rotatably mounted at a corresponding position on the housing 1. The tail end pivot point 2C is comprised of a rotating shaft 22 on the middle support plate portion 20C. Stirring pins 9 (a first stage lever stirring pin 9A, a second stage lever stirring pin 9B) stirred by the first-stage lever 2 from different directions are upwardly erected on the supporting plate 20, and are corresponding to two sides in the axial direction of a rotating center of the supporting plate 20. The bottom of the stirring pin 9 close to the moving grid 6 is erected on the supporting plate 20 through an insulating sleeve 16. One end (fixed end 15A) of the wire 15 is connected to the fixing grid 5, and the other end (pin end 15B) of the wire 15 is connected to the stirring pin 9 close to the moving grid 6. The fixing grid 5, the wire 15, the stirring pin 9 close to the moving grid and the first-stage lever 2 can form a connected signal circuit or a disconnected signal circuit when the first-stage lever 2 stirs the supporting plate 20 in different directions. The microcontroller recognizes the swinging direction of the first-stage lever 2 according to the connection and disconnection of the signal circuit, and amends a manufacturing or assembling error of components on two sides of a rotary center of the first-stage lever 2 in the axial direction of the housing 1.

Referring to FIG. 18, when the tail end of the first-stage lever 2, namely, the moving grid 6, is rotated in a direction b, the position (the middle) corresponding to the stirring pin 9 away from the moving grid 6 is also rotated in the direction b, and the middle of the first-stage lever 2 will be away from the stirring pin 9 close to the moving grid 6. As the insulating sleeve 16 is arranged at the bottom of the stirring pin 9, when the middle of the first-stage lever 2 is separated from the stirring pin 9 close to the moving grid 6, a state of the signal circuit formed by the fixing grid 5, the wire 15, the stirring pin 9 close to the moving grid 6, and the first-stage lever 2 is changed from connection to disconnection. Conversely, when the tail end of the first-stage lever 2 is rotated in the direction opposite to the direction b, the middle of the first-stage lever 2 will always cling to the stirring pin 9 close to the moving grid 6 in the whole rotating process, so that the signal circuit will remain in the connection state (the supporting plate is rotated synchronously and is restored after rotation). The microcontroller can recognize the rotation direction of the first-stage lever 2 according to the change of the state of the signal circuit, and then amends the manufacturing or assembling error of the components on the two sides of the rotary center of the first-stage lever 2, respectively, so that an accuracy error is avoided eventually.

Seventh Embodiment

In this embodiment, the anti-slanting-swinging mechanism is changed, and other structures are the same as those in the sixth embodiment. As shown in FIGS. 20-23, the anti-slanting-swinging mechanism includes balls 17 and a rotary member 18 located in the middle of the end of the housing 1. Tapered grooves matched with the balls 17 are formed at the top and the bottom of the rotary member 18, respectively. There are two balls 17 which are respectively located in the tapered grooves. The middle of the first-stage lever 2 is connected to the rotary member 18. A cover body 19 for pressing the ball 17 into the corresponding tapered groove for limiting the slanting swinging of the rotary member 18 is threadedly mounted at each end of the housing 1 corresponding to the ball 17. In addition, the tapered grooves matched with the balls 17 are formed in the cover bodies 19 and are corresponding to the balls 17. The positions of the balls 17 in the tapered grooves can be adjusted by rotating the upper and lower cover bodies 19, so that the two sides of each of the top and bottom of the ball 17 are tangent to the inner wall of the corresponding tapered groove, ensuring that the ball 17 can only rotate in the tapered groove in its axial direction without slanting swinging. Meanwhile, the balls 17 can rotate with the minimum frictional force, thereby ensuring the constant gap between the moving grid 6 and the fixing grid 5 during the rotation of the moving grid 6.

The foregoing descriptions are only preferred embodiments of the present invention, and do not intend to limit the present invention. Any variation, equivalent substitution and modification that fall within the spirit and principle of the present invention should be embraced by the protective scope of the present invention.

We claim:

1. A lever indicator, comprising
a housing having an inner volume and an outer surface;
a liquid crystal display on said outer surface of said housing;
a measuring lever having a front end and a tail end opposite said front end and being rotatably mounted to said housing, said tail end having a tail end pivot point within said inner volume
wherein said front end is extended outward from said housing and is comprised of a measuring contactor;
a displacement sensor being located within said inner volume and being comprised of a fixing grid fixedly attached to said housing within said inner volume, and a moving grid fixedly attached to said tail end so as to be rotatable around said tail end pivot point concurrent with said tail end; and
a microcontroller being located within said inner volume and being in communication with said displacement sensor and said liquid crystal display so as to generate a measurement result from signals from said displacement sensor based on rotation of said tail end and said moving grid relative to said tail end pivot point and to display said measurement result on said liquid crystal display,
wherein said displacement sensor is comprised of any one of a group consisting of: a capacitive grid sensor, a magnetic grid sensor, and a charge-coupled device (CCD) displacement sensor, and
wherein said fixing grid is between said housing and said tail end of said measuring lever.

2. The lever indicator of claim 1, further comprising:
an anti-slanting-swinging means for said measuring lever during rotation around said tail end pivot point, said anti-slanting-swinging means being mounted on the housing.

3. The lever indicator of claim 2, further comprising:
a supporting plate being comprised of a front end support plate portion, a tail end support plate portion opposite said front end support plate portion, and a middle support plate portion between said front end support plate portion and said tail end support plate portion,
wherein said tail end pivot point is comprised of a rotating shaft on said middle support plate portion; and
a fixing plate being arranged in the housing, and above said rotating shaft,
wherein said rotating shaft has a top rotatably mounted in said fixing plate and a bottom rotatably mounted at a corresponding position on said housing,
wherein the measuring lever is comprised of a first-stage measuring lever,
wherein said first-stage lever comprises:
a front end first-stage lever portion extending out of said housing, said measuring contactor being attached to said front end first-stage lever portion
a tail end first-stage lever portion opposite said front end first-stage lever portion, and
a middle first stage portion between said front end first-stage lever portion and said tail end first stage lever portion, said middle first stage portion being rotatably mounted at a first stage pivot point at an end of said housing,
wherein said moving grid is fixed onto said tail end first-stage lever portion,
wherein said anti-slanting-swinging means is comprised of:
a first limiting screw being mounted in the housing below said moving grid; and
a second limiting screw located on said fixing plate above said tail end first-stage lever portion.

4. The lever indicator of claim 3, further comprising:
a first stage lever stirring pin being attached to said front end support plate portion and being in contact engagement with said tail end first stage portion;
a second stage lever stirring pin being attached to said tail end support plate portion and being in contact engagement with said fixing grid;
a wire being in communication with said microcontroller and having a fixed end connected to said fixing grid and a pin end connected to said second stage lever stirring pin so as to recognize a direction in which the first-stage lever rotates said support plate; and
an insulating sleeve attaching said second stage lever stirring pin to said tail end support plate portion of said support plate,
wherein said fixing grid, said wire, and said second stage lever stirring pin have a connected signal circuit configuration,
wherein said fixing grid, said wire, and said second stage lever stirring pin have a disconnected signal circuit configuration, said first-stage lever rotatably engaging said second stage lever in different directions so as to switch said fixing grid, said wire and said second stage lever stirring pin between said connected signal circuit configuration and said disconnected signal circuit configuration as signals from said displacement sensor.

5. The lever indicator of claim 1, wherein said measuring lever comprises:
a first-stage lever being comprised of:
a front end first-stage lever portion extending out of said housing, said measuring contactor being attached to said front end first-stage lever portion,
a tail end first-stage lever portion opposite said front end first-stage lever portion, and
a middle first stage portion between said front end first-stage lever portion and said tail end first stage lever portion, said middle first stage portion being rotatably mounted at a first stage pivot point at an end of said housing; and a second stage lever being comprised of:
　a front end second-stage portion connected to said tail end first-stage lever portion,
　a tail end second-stage portion opposite said front end second-stage portion, and
　a middle second stage portion between said front end second-stage lever portion,
wherein said tail end pivot point is comprised of a rotary center shaft attached to said middle second stage portion, said tail end second-stage portion of said second-stage lever being rotatable inside the housing as said tail end of said measuring lever, and
wherein said moving grid is fixed onto said tail end second stage portion of said second-stage lever;
　a first stage lever stirring pin being attached to said front end second stage portion and being in contact engagement with said tail end first stage portion;
　a second stage lever stirring pin being attached to said tail end second stage portion and being in contact engagement with said fixing grid; and
　an anti-slanting-swinging means for said second-stage lever to ensure a constant gap between said fixing grid and said moving grid during rotation at said rotary center shaft.

6. The lever indicator of claim 5, further comprising:
a fixing plate being arranged in the housing, and above said rotary center shaft,
wherein said rotary center shaft has a top rotatably mounted in said fixing plate and a bottom rotatably mounted at a corresponding position on said housing, and
wherein said anti-slanting-swinging means is comprised of:
　a first limiting screw being mounted in the housing below said moving grid; and
　a second limiting screw located on said fixing plate above said tail end first-stage lever-portion.

7. The lever indicator of claim 5, wherein said anti-slanting-swinging means is comprised of:
　an upper position deep-groove ball bearing on said rotary center shaft within said housing below said second stage lever; and
　a lower position deep-groove ball bearing on said rotary center shaft below said upper position deep-groove ball bearing.

8. The lever indicator of claim 5, wherein said anti-slanting-swinging means is comprised of:
　an upper position thrust ball bearing on said rotary center shaft within said housing below said second stage lever; and
　a lower position thrust ball bearing on said rotary center shaft below said upper position thrust ball bearing.

9. The lever indicator of claim 5, further comprising:
a fixing plate being arranged in the housing, and above said rotary center shaft,
wherein said rotary center shaft has a top rotatably mounted in said fixing plate and a bottom rotatably mounted at a corresponding position on said housing, and
wherein said anti-slanting-swinging means is comprised of:
　an upper position limiting shaft within said housing and the above said tail end second stage lever portion of said second-stage lever; and
　a lower position limiting shaft within said housing and below said tail end second stage lever portion of said second-stage lever, said lower position limiting shaft being parallel to said upper position limiting shaft.

10. The lever indicator of claim 5, further comprising:
a fixing plate being arranged in the housing, and above said rotary center shaft,
wherein said rotary center shaft has a top rotatably mounted in said fixing plate and a bottom rotatably mounted at a corresponding position on said housing, and
wherein said anti-slanting-swinging means is comprised of:
a guiding groove located at an end of said housing, said tail end second stage lever portion being in sliding engagement with said guiding groove, and
wherein said tail end second stage lever portion extends past said moving grid so as to sliding engage said guiding groove.

11. The lever indicator of claim 5, further comprising:
a wire being in communication with said microcontroller and having a fixed end connected to said fixing grid and a pin end connected to said second stage lever stirring pin so as to recognize a direction in which the first-stage lever rotates said second-stage lever; and
an insulating sleeve attaching said second stage lever stirring pin to said tail end second stage lever portion of said second stage lever,
wherein said fixing grid, said wire, and said second stage lever stirring pin have a connected signal circuit configuration,
wherein said fixing grid, said wire, and said second stage lever stirring pin have a disconnected signal circuit configuration, said first-stage lever rotatably engaging said second stage lever in different directions so as to switch said fixing grid, said wire and said second stage lever stirring pin between said connected signal circuit configuration and said disconnected signal circuit configuration as signals from said displacement sensor.

* * * * *